June 30, 1953 — G. J. SCHOESSOW — 2,643,673
PRESSURE RELIEF VALVE HAVING ITS INLET AND OUTLET IN ALIGNMENT
Filed Jan. 14, 1948

INVENTOR
Glen J. Schoessow
BY J. P. Moran
ATTORNEY

Patented June 30, 1953

2,643,673

UNITED STATES PATENT OFFICE 2,643,673

PRESSURE RELIEF VALVE HAVING ITS INLET AND OUTLET IN ALIGNMENT

Glen J. Schoessow, Barberton, Ohio, assignor to The Babcock & Wilcox Company, New York, N. Y., a corporation of New Jersey Application January 14, 1948, Serial No. 2,225

7 Claims. (Cl. 137—536)

1

This invention relates to the construction and operation of valves especially adapted for use in conjunction with pressure vessels for the relief of internal fluid pressure above a predetermined value.

With present day high capacity steam generating units operating at high pressures of the order of 1200 p. s. i. and above, pressure relief valves, or so called safety valves, of high relieving capacity, form an essential part of each installation. While the required steam relieving capacity is adequately provided by a nominal number of high capacity valves, other problems are involved in that with the type of safety valve ordinarily employed the forces developed at high rates of discharge cause the valve and related portions of the pressure retaining structure to be subjected to severe stresses and strains. For example, in a steam boiler unit wherein the customary angle type of outside spring loaded safety valve is employed, the steam is discharged from the body of the valve through an outlet passage at right angles to the axis of the valve inlet and, in some designs, the ultimate discharge of steam to atmosphere is along an axis offset from the axis of the valve inlet. In such arrangements, the reactive forces result in the development of bending moments which require compensation by increasing the strength of component parts, usually through uneconomical use of more expensive materials of greater thickness and weight.

It is an aim of the present invention to provide a high capacity relief or safety valve so arranged and mounted with respect to a boiler steam drum or chamber that the discharge of steam will produce a minimum of stress developing bending moments in related portions of the assembly such as the valve body, the valve connection to the drum or other vessel, and the pressure vessel wall.

In the assembly of safety valve herein disclosed, steam enters the valve from a flanged nozzle connection which is arranged radially of a cylindrical boiler drum or header and, after passing through the open valve, the steam is discharged to atmosphere in a corresponding radial direction. The reactive forces or thrusts which result from the discharge of fluid at high rates are thus exerted upon the valve and nozzle assembly in axial alignment with the nozzle connection whereby all major forces are applied symmetrically so that no bending moments are developed in pressure retaining portions of the valve body or flange.

My invention therefore contemplates the provision of a pressure relief valve especially adapted for high pressure, high capacity operation by arranging to discharge fluid from the valve in axial alignment with fluid entry into the valve.

2

An object is also to provide a pressure relief valve having its inlet and its outlet coaxially arranged and connected by circumferentially spaced conduit portions.

Another object is to provide a pressure relief valve having adjustable valve loading means located exteriorly of fluid flow passages in axial alignment with the valve inlet and outlet.

Other objects include provision of a pressure relief valve having its major body portion adapted for economic fabrication utilizing commercially available tubular components.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Figures 1, 2, 3:
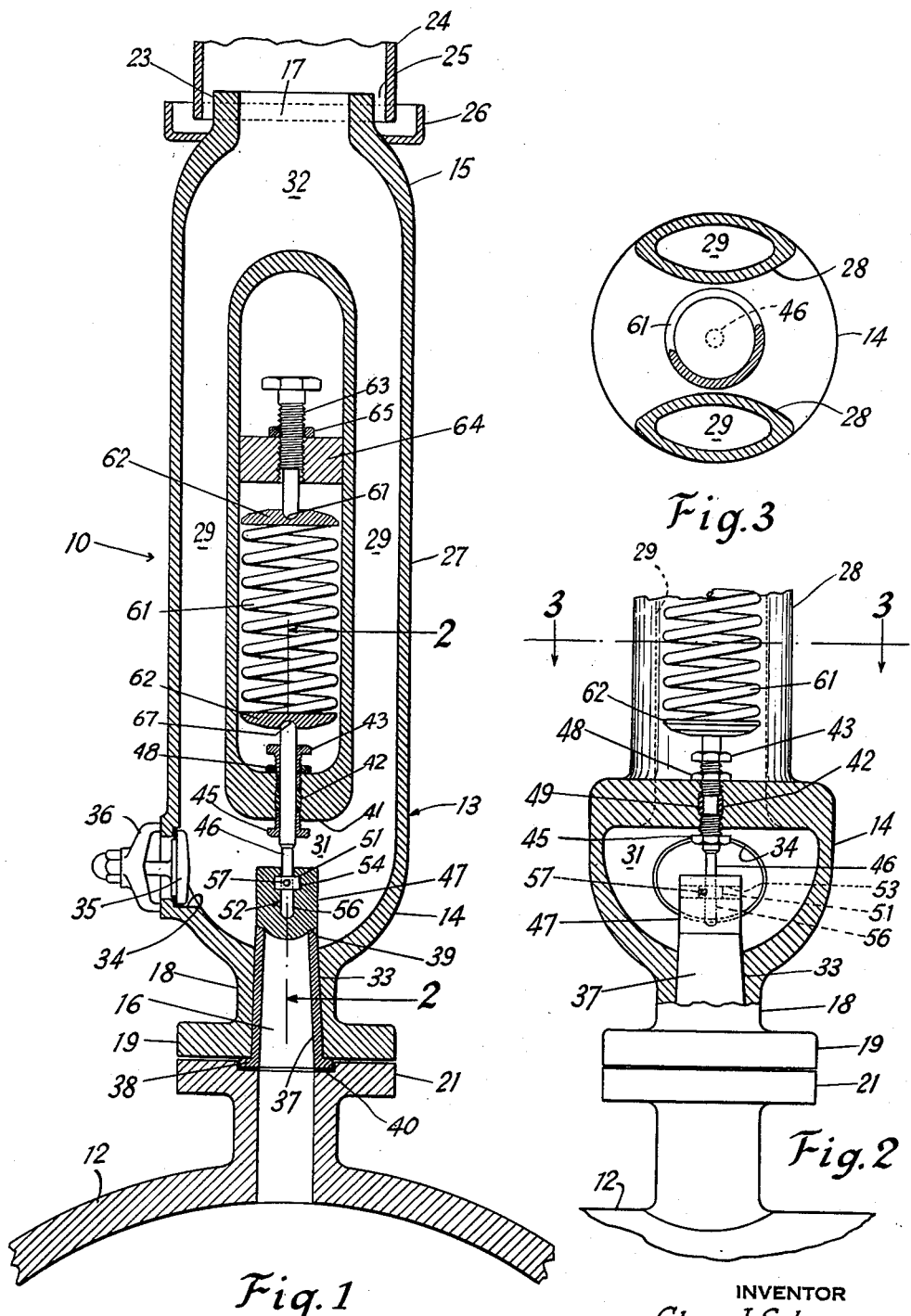
Fig. 1 is an elevational view in section showing an embodiment of my invention as applied to a pressure vessel.
Fig. 2 is a side elevation of the assembly of Fig. 1, partly in section along line 2—2.
Fig. 3 is a sectional plan view taken along line 3—3 of Fig. 2.

In more detail, Fig. 1 illustrates an improved form of relief or safety valve 10 suitably mounted on an upper wall portion of a pressure vessel 12 which, for example, may be employed as the steam-and-water drum of a boiler or as the outlet header of a vapor superheating apparatus. The valve 10 includes an elongate body member 13 of generally tubular formation arranged symmetrically about a substantially straight and vertical axis, in common with the axis of fluid flow therethrough, the body member terminating in opposite cylindrical end portions 14 and 15 of circular cross section providing respectively a lower inlet passage or opening 16 and an upper outlet passage or opening 17 in coaxial alignment. The lower body portion 14 is extended to provide a neck portion 18 of reduced diameter formed with a lower inlet flange 19 for connection to a companionate outlet flange 21 of vessel 12. The upper body portion 15 is extended to provide a cylindrical outlet end 23 of reduced diameter adapted to project into the lower end of an upright venting conduit 24 for normal discharge therethrough, an annular space 25 being provided therebetween to permit freedom of valve movement relative thereto as a result of expansion and contraction. A flanged tray or cup 26 secured to body 13 serves as a collector for condensate draining downwardly from within conduit 24.

The valve body 13 includes an intermediate bifurcated portion 27 having a pair of tubular branches 28 which are symmetrically arranged in circumferentially spaced relation about the central axis of the body and which provide passages 29 connecting the inlet and outlet openings 16 and 17, the passages 29 being of equal flow areas and uniting in chambers 31 and 32 immediately inward of openings 16 and 17 respectively. In the form shown, the branch conduits 28 are of flattened cross section, approximately elliptical in shape, and lie within the axially projected cylindrical boundaries of body portions 14 and 15. An oval hand-hole opening 34, formed in the wall of valve body 13 to provide access to valve chamber 31, is provided with a removable cover 35 having a known type of holding means 36.

The inlet opening 16 is preferably provided by the inside bore of a liner or bushing 37 assembled axially of the neck portion 18 in pressure tight engagement with the tapered wall of neck opening 33, the bushing 37 having inner and outer circumferential surfaces of decreasing taper in the direction of fluid flow and having a transverse inlet end flange 38 adapted to seat against the adjacent end surface of the body flange 19. The inner end of bushing 37 projects inwardly beyond the wall of chamber 31 and is formed with an annular valve seat 39 of generally conical formation to which access may be had for inspection or resurfacing through access opening 34. A gasket 40 between bushing flange 38 and nozzle flange 21 enables a pressure-tight joint to be maintained between the valve and drum, it being understood that flanges 19 and 21, together with gasket 40, are suitably held in assembled relation by bolts or other known holding means, not shown.

The inner wall 41 of chamber 31, of considerably greater thickness than other walls thereof, is formed with an opening 42 extending axially therethrough and threadably receiving bushings 43 and 45 which combine to form a central guide passage for a valve stem or spindle 46 having a valve block or disc 47 loosely secured thereto at its lower end, the neck opening 33 and the access opening 34 each being of large enough area to permit the passage of block 47 and other parts therethrough, for the purpose of assembly or replacement. The upper bushing 43 is preferably locked in position by means of a lock nut 48 while the lower bushing 45 is left relatively free for adjustment of pressure on packing 49 by which escape of steam or other vapor is prevented. The attachment of valve block 47 to valve stem 46, as herein illustrated, will be understood to provide a connection causing the valve and stem to move axially in unison while permitting self-adjustment of the valve block into seated position upon movement into engagement with valve seat 39.

As shown, the lower end of valve stem 46, of circular formation about a central axis and having a separable intermediate collar portion 51, is received and retained within a recess or socket 52 formed in valve block 47, the socket 52 conforming in cross section to the cross-sectional configuration of the valve stem as seen in Fig. 1, while allowing adequate clearances axially and radially of the stem to permit self-alignment of the valve with respect to its seat as above mentioned. The socket 52 may include a lower portion 56 axially drilled to receive the lower end of valve stem 46, while the upper portion 53 is suitably formed as an inverted T-shaped slot extending transversely of valve block 47 throughout at least a major portion of the block diameter or width. The collar 51 which is received within the T-head section 54 of the socket is removably secured to the central body portion of valve spindle 46 suitably by means of a set screw 57. The valve stem 46 and valve disc 47 may thus be removed as a unit through the neck opening 33, following removal of inlet bushing 37 or, if desired, the stem 46 and disc 47 may be disassembled by backing-off set screw 57 and the parts removed separately through side wall opening 34.

The valve loading mechanism is mounted centrally of the space between the body bifurcations or branches 28 and, in the form shown, comprises a spring 61 disposed between spring abutment plates 62 at opposite ends. Spring tension is regulated by means of adjusting screw 63 threaded into a cross bar 64 suitably secured at opposite ends, as by welding, to branches 28, the adjusting screw being fitted with a lock nut 65 for maintaining spring tension adjustment. The adjusting screw 63 and the valve stem 46 each terminate in a rounded end 67 adapted to seat within a rounded recess centrally of the adjacent spring plate 62 for maintaining the spring and plate assembly in axial alignment.

In a relief valve of the construction disclosed, the flow of fluid is in the same general direction throughout, longitudinally of the main central axis of the valve body. The branch conduits 28, in addition to serving as conductors for fluid from inlet chamber 31 to outlet chamber 32, also serve as spacer members rigidly connecting the body end portions 14 and 15 and thereby maintaining the valve inlet 16 and valve outlet 17 in axial alignment. The thrusts or reactive forces resulting from fluid discharge at high rates are thus transmitted axially of the valve body and do not cause bending moments to be set up in either the valve body 13 or in its nozzle support on drum 12.

The disclosed form of relief valve construction is also advantageous in that the valve loading mechanism is located exteriorly of fluid flow passages and thus is not only shielded from fluid flow but being disposed exteriorly of the valve body is continuously exposed to atmospheric temperature conditions. In this position, the mechanism is readily and continuously accessible from the exterior for inspection and replacement of parts. In this exterior position also, the mechanism is protected from damage by the branch conduits 28 which are arranged outwardly thereof at circumferentially distributed locations.

The disclosed construction of relief valve is also advantageous from a standpoint of economical fabrication in that the body may be constructed from commercially available tubular components suitably formed and welded together. This method of fabrication often results in a structure of greater strength for a given weight of parts than is possible in a valve structure where castings are employed. It is to be understood, however, that part-welded, forged, or cast constructions may also be employed to advantage, the type of construction being determined, for example, by the manufacturing facilities available.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. In a relief valve, a valve body having a valve chamber therein, means forming an inlet to said chamber comprising a bushing removably assembled within an opening in a wall of said chamber and terminating inwardly of said chamber, a valve disc within said chamber axially movable with respect to an annular seat at the inner end of said bushing, a valve stem connected to said disc and extending to the exterior of said body through an opposite wall of said chamber, said wall opening for said bushing being of large enough area to permit insertion and removal of said valve stem and disc therethrough, and a valve loading mechanism engaging an exteriorly positioned portion of said stem.

2. In a relief valve, a valve body providing an inlet and an outlet each centrally disposed and substantially aligned with the other at opposite ends and having a chamber at each end in communication with said inlet and said outlet respectively, said body including a stationary wall at the inner end of each of said chambers and further including a conduit connecting said chambers, a valve in said inlet end chamber operable with respect to a seat surrounding said inlet, a valve stem engaging said valve and extending through said inner stationary wall of said inlet chamber, resilient valve loading means arranged externally of said body at a location intermediate said chambers and exerting an inward thrust on said valve stem urging said valve toward said seat, means including said conduit for maintaining said inlet and said outlet in axial alignment, and abutment means associated with said last named means for resisting the outward thrust of said resilient valve loading means.

3. In a relief valve assembly, a valve body providing an inlet and an outlet each centrally disposed and substantially aligned with the other at opposite ends, said body providing chambers at opposite ends including a valve chamber adjacent said inlet, said body including a stationary wall at the inner end of each of said chambers and further including an intermediate conduit portion providing a fluid flow passage connecting said chambers, a valve in said valve chamber operable with respect to said inlet, a valve stem engaging said valve and extending through said inner stationary wall of said inlet chamber, and valve loading means arranged exteriorly of said body and engaging said valve stem to close said valve, said valve loading means being supported on said conduit portion exteriorly of said fluid flow passage in a space exposed to the atmosphere surrounding said assembly.

4. A relief valve having an elongate tubular body providing an inlet, and an outlet in alignment along a common axis, said body providing chambers at opposite ends including a valve chamber providing a seat annularly of said inlet, said body including an intermediate portion comprising a group of physically distinct conduits circumferentially spaced about said axis and providing passages of equal flow areas connecting said chambers, a stationary wall opposite said inlet and separating said valve chamber from all spaces separating said conduits, a valve in said valve chamber operable with respect to said seat, and valve loading means disposed inwardly of said group of conduits exteriorly of said chambers and passages, the spaced arrangement of said conduits providing openings therebetween through which said valve loading means is exposed to the atmosphere surrounding said body.

5. A relief valve having a tubular body providing an inlet and an outlet at opposite ends, said body providing chambers inwardly adjacent said inlet and said outlet respectively, said body having an intermediate portion formed of spaced conduits providing passages connecting said chambers, a valve in one of said chambers, and valve loading means disposed centrally of said conduits and removable through the space separating one of said conduits from the conduit adjacent thereto.

6. A relief valve having a tubular body providing an inlet and an outlet in alignment along a common axis, said body providing chambers of substantially circular cross section inwardly adjacent said inlet and said outlet respectively, said body having an intermediate portion comprising a group of physically distinct conduits of radially flattened cross section providing passages of equal flow areas connecting said chambers, said conduits being circumferentially spaced in symmetrical arrangement with respect to said axis and lying within the projected circumferential boundaries of said chambers, said chamber adjacent said inlet constituting a valve chamber providing a seat annularly of said inlet and formed with a stationary wall oppositely spaced from said seat, a valve in said valve chamber operable with respect to said seat, and valve loading means disposed centrally of said group of conduits at the opposite side of said wall and including spring means continuously shielded from exposure to fluid flow through said chambers and passages, successive conduits of said group having spaces therebetween through which valve loading means is rendered accessible from the exterior of said body.

7. In a relief valve, a valve body having a valve chamber therein, said body at one end providing a fluid inlet into said chamber and at the opposite end providing a fluid discharge passage in coaxial alignment with said inlet, sad body having a transverse integral wall portion inwardly spaced from said inlet and forming a stationary exterior wall of said chamber, a group of physically distinct spaced tubular elements connecting said chamber to said fluid discharge passage and secured at one end to said transverse wall, a valve in said chamber arranged in operative relation to said inlet, a valve stem engaging said valve and extending through said stationary wall to the exterior of said chamber, and valve loading means cooperating with said valve stem and arranged exteriorly of said transverse wall between said tubular elements.

GLEN J. SCHOESSOW.

References Cited in the file of this patent

UNITED STATES PATENTS

| Number | Name | Date |
| --- | --- | --- |
| 287,167 | Richardson | Oct. 22, 1883 |
| 592,986 | Fortner | Nov. 2, 1897 |
| 1,071,972 | Wofer | Sept. 2, 1913 |
| 1,377,199 | Granby | May 10, 1921 |
| 2,166,390 | Briscoe | July 18, 1939 |
| 2,226,732 | McBride | Dec. 31, 1940 |